Aug. 30, 1949.

W. SELOVE 2,480,201

APPARATUS FOR COMPRESSING THE
AMPLITUDE RANGE OF SIGNALS

Filed May 8, 1946

INVENTOR.
WALTER SELOVE
BY
William D. Hall,
ATTORNEY

Patented Aug. 30, 1949

2,480,201

UNITED STATES PATENT OFFICE 2,480,201

APPARATUS FOR COMPRESSING THE AMPLITUDE RANGE OF SIGNALS

Walter Selove, Chicago, Ill., assignor, by mesne assignments, to the United States of America as represented by the Secretary of War Application May 8, 1946, Serial No. 668,295

4 Claims. (Cl. 178—44)

This invention relates to electrical circuits, and more particularly to a circuit for reducing the dynamic range of amplitude of a series of signals.

In a moving target indication radar system of the type disclosed in the copending application of Robert H. Dicke, entitled "Communication system," Serial No. 590,052, filed April 24, 1945, several series of pulses are obtained, each series of which is produced by a single target. The series of signals returned by any specific target will vary in amplitude or be of constant amplitude depending upon whether or not the target has relative velocity with respect to the radar system. For any specific target the variation in amplitude of the returned signals is controllable. However, the amplitudes of signals returned by different targets may have large ratios depending upon the size and range of the targets. Moving target indication is provided by differentiating between those series of pulses which vary in amplitude and those series of signals which do not vary in amplitude. The extreme signal ratios present in such a system increases the difficulties encountered in designating the system and especially in designing the differentiating circuits.

It is desirable to reduce the dynamic range of signal amplitudes applied to the differentiating circuit. In certain moving target indication radar systems the detection of weak signals from moving targets depends on the detection of signal-to-signal amplitude changes at the input of the differentiating circuit; reduction in dynamic range should not, therefore, alter signal-to-signal amplitude increments. It is an object of the present invention to provide essentially such operation.

For a better understanding of the invention, together with other and further objects thereof, reference is had to the following description which is to be read in connection with the accompanying drawing in which.

Figure 1:
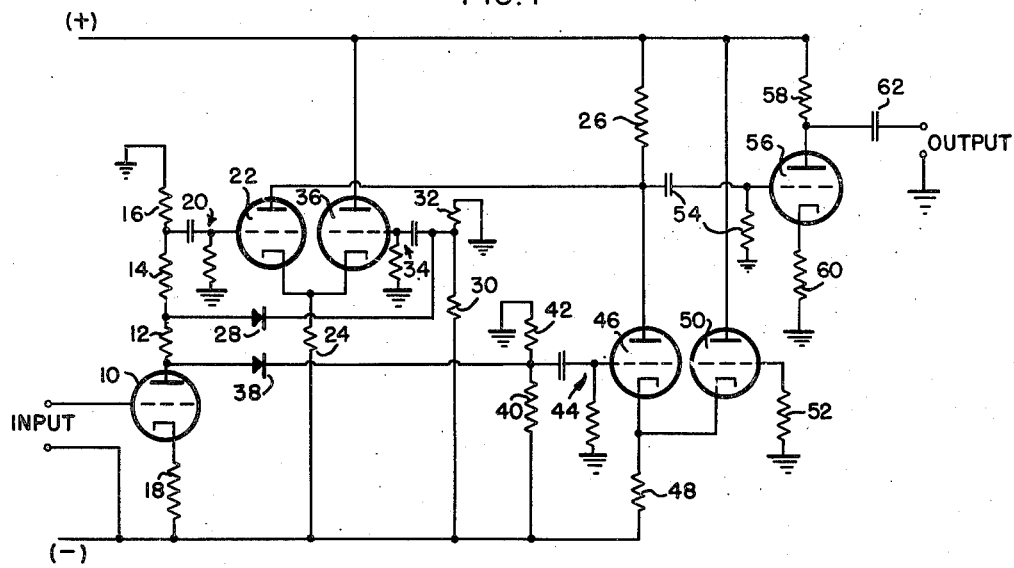
Fig. 1 is a circuit diagram of the present invention.

Referring now to the drawing, and more particularly to Fig. 1 thereof, there is shown an electron tube 10 connected as a voltage amplifier and having plate load resistors 12, 14 and 16 serially connected between the anode thereof and ground, which is connected to a positive terminal of the plate potential source, not shown. The cathode is connected through a suitable resistor 18 to a suitable source of negative potential. Input signals to the amplifier are applied at the terminals marked "input," which terminals are connected between the negative source and the control grid of the tube 10. The junction of resistors 14 and 16 is connected through a resistance-capacitance network 20 to the control grid of an electron tube 22. The cathode of the tube 22 is returned through a suitable resistor 24 to the aforementioned negative potential source. The anode of the tube 22 is connected through a load resistor 26 to a suitable source of positive potential. The junction of resistors 12 and 14 is connected through a suitable rectifier 28, which may be of the diode tube or crystal type, to the junction of two resistors 30 and 32 which are serially connected between the aforementioned negative potential source and ground. The purpose of the resistors 30 and 32 is to provide a voltage divider network to properly bias the rectifier 28. The junction of the resistors 30 and 32 is connected through a resistance-capacitance network 34 to the control grid of an electron tube 36, the cathode of which is connected to the cathode of the tube 22. The anode of the tube 36 is returned directly to the aforementioned positive potential source. A second rectifying device 38 is connected between the anode of the tube 10 and the junction of two resistors 40 and 42 which are serially connected between the aforementioned negative potential source and ground. The resistors 40 and 42 provide a voltage divider network for properly biasing the rectifier 38. The junction of the resistors 40 and 42 is connected through a resistance-capacitance network 44 to the control grid of an electron tube 46. The cathode of the tube 46 is returned through a suitable resistor 48 to the aforementioned negative potential source. The anode of the tube 46 is connected to the anode of the tube 22 and, therefore, shares the plate load resistance 26. The anode of an electron tube 50 is connected to the aforementioned positive potential source and the cathode of this tube is connected to the cathode of the tube 46. The control grid of the tube 50 is connected through a resistor 52 to ground. The anodes of the tubes 22 and 46, which are connected together, are connected through a resistance-capacitance network 54 to the control grid of an electron tube 56. The anode of the tube 56 is connected through a load resistor 58 to the aforementioned positive potential source, and the cathode is returned through a suitable resistor 60 to ground. Output signals from the circuit of Fig. 1 are obtained from the anode of the tube 56 through a capacitor 62.

Figure 2:
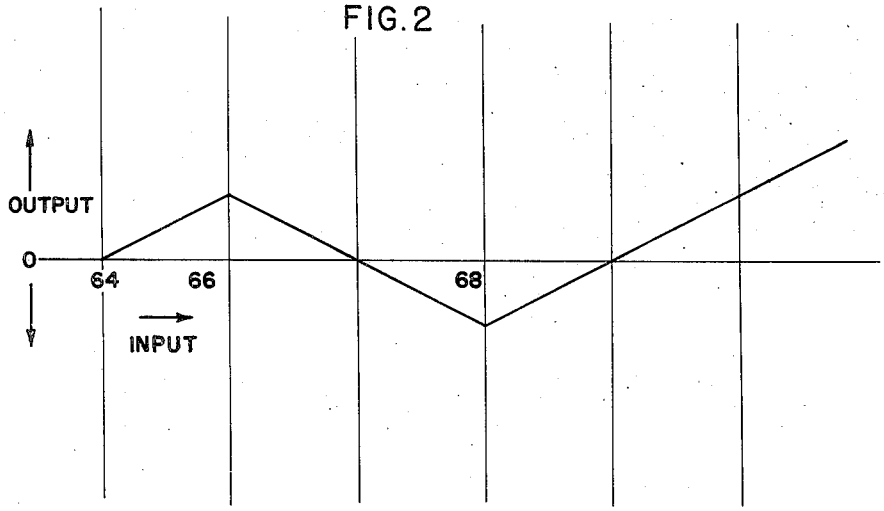
Fig. 2 illustrates the input-output characteristics of the circuit.

The operation of the circuit of Fig. 1 will be given by referring to the characteristic shown in Fig. 2 and describing the manner in which this characteristic is obtained. In Fig. 2 input signal (the arrow on Fig. 2 shows the direction of more negative input signals) amplitude is plotted as the independent variable and the output signal amplitude is plotted as the dependent variable.

For input signals having amplitudes lying within the range defined by the numerals 64 and 66 in Fig. 2, the overall amplification of the circuit of Fig. 1 will be a constant and the amplitude of the output signal will, therefore, bear a constant ratio to the amplitude of the input signal. For signals whose amplitudes lie within the range from 64 to 66, only the tubes 10, 22, and 56 are responsive to signals. The tube 36 is prevented from being responsive to said signals by the bias applied from the junction of the resistors 30 and 32 to the rectifier 28, since the bias is not overcome by the potential at the junction of resistors 12 and 14. The tube 46 is also not responsive for a similar reason. For signals having amplitudes which lie within the range from 66 to 68 in Fig. 1, the overall incremental gain of the circuit of Fig. 2 is reversed in sign so that an incremental increase in input signal amplitude results in an incremental decrease in output signal amplitude. It will be seen from Fig. 2 that the absolute value of the incremental amplification of the circuit of Fig. 1 is a constant throughout the interval 66 to 68 and that this gain is equal in absolute magnitude to the gain of the circuit for signals lying within the amplitude range 64 to 66. For signals whose amplitudes are within the range 66 to 68, the tubes 10, 22, 36 and 56 are responsive. The tube 46 is unresponsive, for reasons heretofore stated. When the input signal has an amplitude greater than the value at 66, the bias on the rectifier 28 is overcome and a signal is applied to the control grid of tube 36. This signal results in a change in the potential on the cathode of the tube 22 by cathode follower action. This signal applied to the cathode of the tube 22 effectively reduces the amplitude of the signal applied to the control grid of this tube thereby giving rise to a total characteristic as shown in Fig. 2 between 66 and 68. For signals whose amplitudes exceed that represented by 68 the bias on the rectifier 38 is overcome and signals are applied to the control grid of the tube 46. The signal at the anode of the tube 46 will be of the same polarity as the signal at the anode of tube 22 and since these signals appear across the common load resistor 26, they will be added. By proper choice of the constants of the circuit associated with the tube 46 the overall incremental gain of the circuit of Fig. 1 can be again reversed for input signals which exceed in amplitude the value represented by 68 thus producing that portion of the characteristic of Fig. 2 lying beyond 68.

From the above discussion it will be seen that the amplitude of the output signals vary between fixed limits, and that for a series of signals whose amplitudes lie within any given range, i. e., 64 to 66, 66 to 68, or above 68, the incremental gain is constant and, further, the signal-to-signal incremental change in amplitude is unaffected.

It will be obvious to one skilled in the art that the apparatus of the present invention may be extended to provide an input-output characteristic which has any desired number of inflection points. Therefore, while there has been described hereinabove what is at present considered to be a preferred embodiment of this invention, it will be obvious to those skilled in the art that various other changes and modifications may be made therein without departing from the spirit and scope of the invention.

What is claimed is:
1. Apparatus for compressing the amplitude range of signals applied thereto, comprising first amplifier means responsive to said signals over the entire amplitude range thereof, second amplifier means responsive to the output voltage of said first amplifier at all amplitude levels thereof, third amplifier means responsive to said output voltage only when the amplitude thereof exceeds a first predetermined value, the output of said third amplifier means being coupled to the input of said second amplifier means to produce a reversal of the effective incremental gain of said second amplifier means, and fourth amplifier means responsive to said output voltage when the amplitude thereof exceeds a second predetermined value greater than said first value, said second and fourth amplifier means having a common load circuit which constitutes the output circuit of said apparatus.

2. An apparatus for compressing the amplitude range of input signals comprising a first vacuum tube having an input circuit and an output load circuit and responsive to all amplitude levels of said signals applied to said input circuit, a second vacuum tube having an input circuit and an output load circuit and responsive only to those input signals exceeding a first predetermined amplitude level, the output of said second vacuum tube being coupled to the input of said first vacuum tube to produce a first reversal of the effective incremental gain in the output of said first vacuum tube, a third vacuum tube having an input circuit and an output load circuit and responsive only to those input signals exceeding a second predetermined amplitude level greater than said first level, and means for combining the outputs of said first and third vacuum tubes to produce a second reversal of the effective incremental gain in the output of said first vacuum tube.

3. An apparatus as set forth in claim 2 wherein the input signals are applied in like phase.

4. An apparatus for compressing the amplitude range of input signals, said apparatus comprising a first vacuum tube circuit responsive to said input signals at all levels thereof, a second vacuum tube circuit responsive to only those of said input signals exceeding a predetermined amplitude level, said first and second vacuum tubes having a common cathode resistor, said resistor comprising the output load circuit of said second vacuum tube whereby the output of said second vacuum tube is applied effectively in opposition to the signals in the input of said first vacuum tube to produce a reversal in the output thereof when said input signals exceed said predetermined amplitude level, a third vacuum tube responsive only to those of said input signals exceeding a second amplitude level greater than said predetermined level, said first and third vacuum tubes having a joint plate load resistor wherein the outputs thereof are combined.

WALTER SELOVE.

REFERENCES CITED

The following references are of record in the file of this patent:

UNITED STATES PATENTS

| Number | Name | Date |
|---|---|---|
| 2,276,565 | Crosby | Mar. 17, 1942 |
| 2,406,882 | Young, Jr. | Sept. 3, 1946 |
| 2,432,878 | Frederick | Dec. 16, 1947 |